United States Patent
Youtz et al.

(10) Patent No.: US 11,272,408 B2
(45) Date of Patent: Mar. 8, 2022

(54) SYSTEMS AND METHODS FOR UE-IMPLEMENTED CELL SCANNING AND REPORTING IN A WIRELESS NETWORK

(71) Applicant: Verizon Patent and Licensing Inc., Arlington, VA (US)

(72) Inventors: Andrew E. Youtz, Princeton, NJ (US); Hui Zhao, Marlboro, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

(21) Appl. No.: 16/718,683

(22) Filed: Dec. 18, 2019

(65) Prior Publication Data
US 2021/0195483 A1   Jun. 24, 2021

(51) Int. Cl.
  *H04W 36/00* (2009.01)
  *H04W 72/06* (2009.01)
  *H04W 48/16* (2009.01)
  *H04W 24/10* (2009.01)

(52) U.S. Cl.
  CPC ..... *H04W 36/00835* (2018.08); *H04W 24/10* (2013.01); *H04W 36/0061* (2013.01); *H04W 36/0088* (2013.01); *H04W 48/16* (2013.01); *H04W 72/06* (2013.01)

(58) Field of Classification Search
  None
  See application file for complete search history.

(56) References Cited

U.S. PATENT DOCUMENTS

| | | | | |
|---|---|---|---|---|
| 2010/0184429 A1* | 7/2010 | Tod | ............... | H04W 36/0061 455/434 |
| 2011/0255478 A1* | 10/2011 | Shen | ............... | H04W 24/10 370/328 |
| 2013/0210438 A1* | 8/2013 | Martin | ............... | H04W 24/02 455/436 |
| 2013/0294354 A1* | 11/2013 | Zhang | ............... | H04W 48/10 370/329 |
| 2014/0113636 A1* | 4/2014 | Lee | ............... | H04W 76/16 455/437 |
| 2015/0092709 A1* | 4/2015 | Su | ............... | H04W 48/16 370/329 |
| 2016/0127956 A1* | 5/2016 | Jujaray | ............... | H04W 48/16 455/437 |
| 2017/0325144 A1* | 11/2017 | Raghunathan | ............... | H04W 36/36 |
| 2019/0313270 A1* | 10/2019 | Lee | ............... | H04W 24/10 |

* cited by examiner

*Primary Examiner* — Joseph E Avellino
*Assistant Examiner* — The Hy Nguyen

(57) ABSTRACT

A system described herein may provide a technique for scanning for cells in a wireless network in a prioritized manner. A User Equipment ("UE") may receive a neighboring cell list ("NCL") or other indication of candidate cells for scanning. The UE may rank the candidate cells (e.g., based on which radio frequency ("RF") band(s) are implemented by the candidate cells), and scan for the presence of the candidate cells in an order that is based on the ranking.

20 Claims, 9 Drawing Sheets

SYSTEMS AND METHODS FOR UE-IMPLEMENTED CELL SCANNING AND REPORTING IN A WIRELESS NETWORK

BACKGROUND

Wireless user equipment ("UE"), such as mobile telephones or other wireless communication devices, may communicate with one or more wireless networks, such as a wireless telecommunications network. In order to identify the presence of cells or other components of the wireless network, a UE may perform radio frequency ("RF") scans. UEs may perform scans on different RF bands in order to identify components that operate at different RF bands and/or utilize different radio access technologies ("RATs").

DETAILED DESCRIPTION OF THE PREFERRED EMBODIMENTS

The following detailed description refers to the accompanying drawings. The same reference numbers in different drawings may identify the same or similar elements.

Embodiments described herein provide for the RF scanning of cells (and/or other RF components) of a wireless network in a manner determined by a UE. For example, the wireless network may offer cells that implement different RF bands, sub-bands, and/or RATs. For instance, cells may implement a Long-Term Evolution ("LTE") RAT, a first portion of a Fifth Generation ("5G") New Radio ("NR") RAT (e.g., a "Sub-6 GHz" band), a second portion of the 5G NR RAT (e.g., a "millimeter-wave" or "mmWave" band), and/or other bands, sub-bands, or RATs. In the examples described herein, the term "band" may be used for the sake of conciseness to refer to different RATs, RF bands, RF sub-bands, etc.

In some situations, it may be beneficial for a UE to connect to cells that implement RATs or RF bands that provide relatively high throughput, low latency, etc. (e.g., cells that implement the mmWave band). In some situations, it may be beneficial for a UE to connect to cells that implement bands that offer relatively larger coverage area (e.g., cells that implement the Sub-6 GHz band). In accordance with embodiments described herein, a UE may scan for cells in an order that maximizes the likelihood of locating, and connecting to, cells that offer a RAT or RF band that is most suitable for the UE, thereby enhancing performance and/or reliability of the UE.

Figure 1:
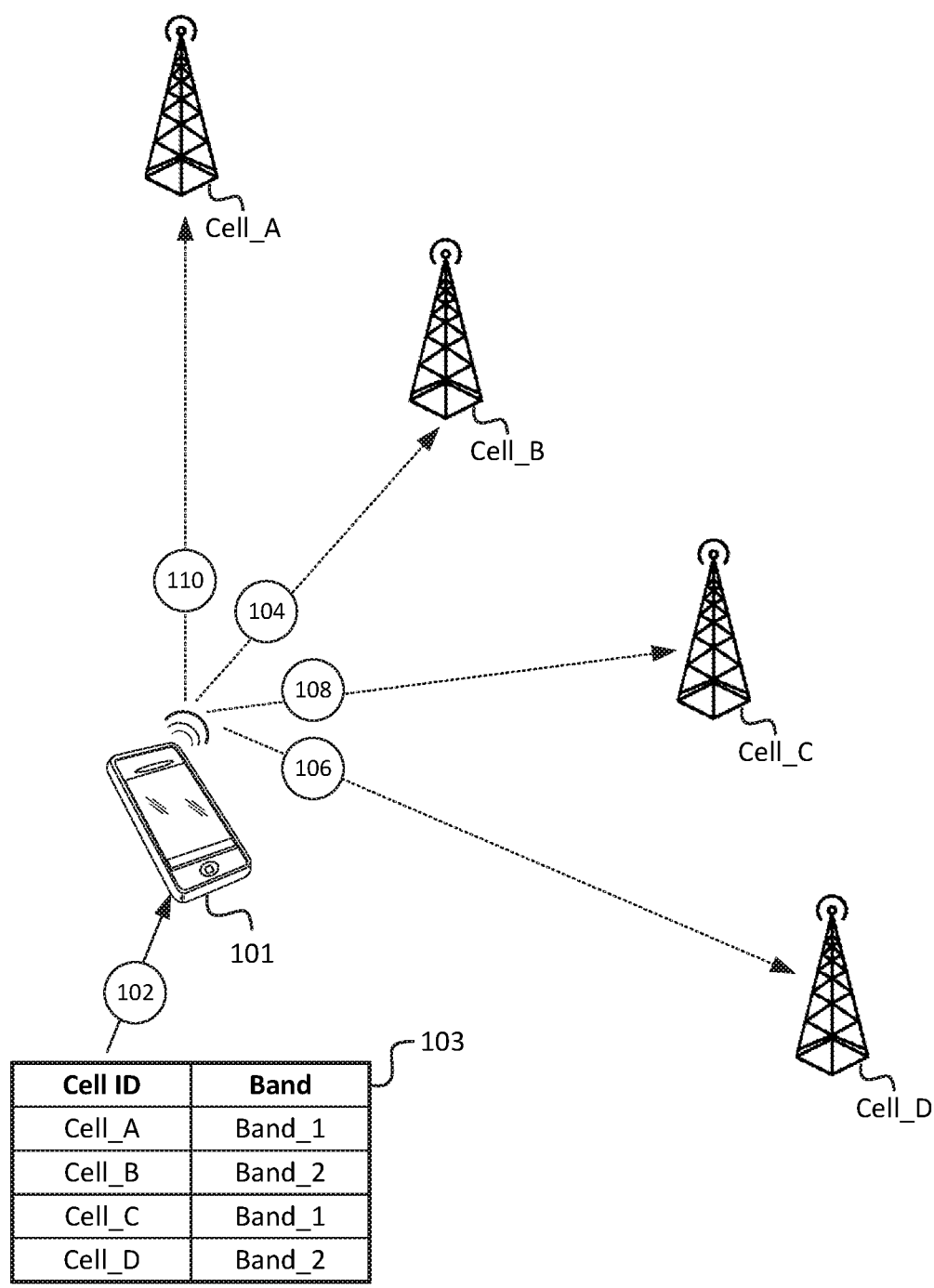
FIG. 1 illustrates an example overview of one or more embodiments described herein, in which a UE may rank a set of candidate cells and scan for the candidate cells in an order that is based on the ranking.

As shown in FIG. 1, for example, as described herein, UE 101 may receive (at 102) a set of candidate cells from a wireless network. The set of candidate cells may, in some embodiments, take the form of Neighboring Cell List ("NCL") 103. The set of candidate cells (e.g., NCL 103) may be provided by a base station (e.g., an evolved Node B ("eNB")) of the wireless network, such as via a Master Information Block ("MIB") broadcasted by the base station, a System Information Block ("SIB") broadcasted by the base station, and/or provided by the base station in some other way. In some embodiments, the set of candidate cells may be provided to UE 101 by a base station to which UE 101 is currently attached.

The set of candidate cells may include information about cells to which UE 101 is physically proximate (e.g., is within a coverage area of the candidate cells). As described herein, a "cell" may refer to one or more devices that include RF circuitry via which UE 101 may receive wireless access to a wireless network. A cell may, in some embodiments, correspond to one base station, and/or a portion of a base station's functionality (e.g., where a particular base station implements multiple cells). In some embodiments, a cell may be implemented by one or more radio units ("RUs") and/or remote radio heads ("RRHs"), which may be communicatively coupled to one or more distributed units ("DUs"), and may be distributed geographically. In some embodiments, a particular cell may be associated with an identifier (e.g., a "Cell ID"), and may implement a particular band or set of bands.

The set of candidate cells (e.g., NCL 103) may be maintained by, and provided by, a base station (e.g., eNB) of the wireless network, where different base stations may maintain different sets of candidate cells (e.g., different NCLs). In some embodiments, the base station may implement one RAT or RF band (e.g., an LTE RAT), while the candidate cells implement one or more different RATs or RF bands (e.g., a 5G NR RAT, a Sub-6 GHz band, an mmWave band, etc.). As shown, NCL 103 may include a Cell ID of the set of candidate cells, as well as an indicator of the band(s) implemented by the candidate cells. For example, as shown in FIG. 1, NCL 103 may identify four example cells: Cell_A, Cell_B, Cell_C, and Cell_D, which implement Band_1, Band_2, Band_1, and Band_2, respectively.

In accordance with some embodiments, UE 101 may be configured to prioritize cells that offer Band_2 over cells that do not offer Band_2 (e.g., cells that offer Band_1) during a neighbor cell measurement and/or scanning process. For example, firmware of UE 101 may be configured to prioritize the cells in this manner during a neighbor cell measurement and/or scanning process, and/or some other portion of UE 101 may be configured to provide information that causes UE 101 to prioritize the cells in this manner (e.g., information stored in a Universal Integrated Circuit Card ("UICC") and/or SIM ("Subscriber Identification Module") of UE 101). In this example, Band_2 may be considered a "preferred" band, as compared to Band_1.

That is, regardless of any order (or lack thereof) of the order in which the candidate cells are indicated to UE 101, UE 101 may, in accordance with some embodiments, rank the candidate cells according to the band(s) implemented by the candidate cells, and scan for the candidate cells in an order that is based on the ranking. Further, UE 101 may measure a signal quality or signal strength for any candidate cells that are detected, and may generate and/or output a measurement report that indicates the measured signal quality and/or signal strength, based on which ultimately a particular cell may be selected.

In some embodiments, UE 101 may output the measurement reports based on the prioritized order of cells, bands, and/or RATs. For example, in some scenarios, UE 101 may scan for cells of multiple bands concurrently, and may complete the scan for one band (e.g., a non-preferred band) before completing the scan for another band (e.g., a preferred band). UE 101 may thus detect the presence of cells of the non-preferred band before detecting the presence of cells of a preferred band. In accordance with some embodiments, UE 101 may wait until the scanning on the preferred band is complete, before generating a measurement report or other indication of detected cells. Additionally, or alternatively, when generating or outputting the measurement report, UE 101 may rank the detected cells based on the priority of the bands implemented by the cells.

For instance, referring again to FIG. 1, UE 101 may identify that Cell_B and Cell_D implement the preferred band (i.e., Band_2, in this example), and/or that Cell_A and Cell_C do not implement the preferred band (i.e., identify that these cells do not implement Band_2, and/or that these cells implement Band_1). Based on identifying that Cell_B and Cell_D implement the preferred band, UE 101 may rank Cell_B and Cell_D ahead of Cell_A and Cell_C.

In some embodiments, the ranking may be based on one or more other factors. For example, load and/or capacity of the respective cells (e.g., where less loaded cells may be ranked higher than more loaded cells), thresholds (e.g., where different cells may be associated with different threshold measures of signal strength), and/or other factors. In this sense, whether a given cell implements a preferred band may be one factor out of multiple factors, based on which the given cell is ranked against other cells. Thus, in some situations, a cell that implements a preferred band may be ranked lower than a cell that does not implement the preferred band (e.g., based on one or more other factors). However, for the sake of simplicity, whether a cell implements the preferred band is described herein as dispositive criteria based on which the cell is ranked against other cells. Further, while described herein in the context of two example bands (i.e., Band_1 and Band_2), in practice, similar concepts may apply to the ranking of candidate cells that implement three or more bands.

Further, as shown, UE 101 may perform sequential scans according to the ranking. As a result of the scanning, UE 101 may generate or receive a measurement report, which indicates a measure of signal strength of RF communications between UE 101 and the candidate cells (including, for instance, a downlink signal quality or signal strength for communications from the candidate cells to UE 101). For example, UE 101 may first scan (at 104) for Cell_B. In accordance with the ranking, UE 101 may next scan (at 106) for Cell_D. For example, UE 101 may not have detected Cell_B as a result of the first scan, and/or a measure of signal strength between UE 101 and Cell_B may be below a threshold measure of signal strength. Similarly, UE 101 may next scan (at 108) for Cell_A (i.e., after scanning for cells that implement Band_2), and may scan (at 110) for Cell_C if the scan for Cell_A was also unsuccessful. In this example, UE 101 may have detected Cell_C as a result of the scan, and may connect (at 112) to Cell_C. In some embodiments, while not described in detail here, connecting to Cell_C may include exchanging Radio Resource Control ("RRC") messaging with Cell_C, with a cell to which UE 101 is anchored, and/or with some other device or system.

Additionally, or alternatively, UE 101 may scan for multiple cells concurrently, and may report the detected cells in an order that is based on the ranking. For example, in some embodiments, UE 101 may wait until the scans for Cell_B and/or Cell_D are complete before generating or outputting any measurement reports. This waiting may be beneficial in situations where UE 101 has detected the presence of Cell_A and/or Cell_C, while still scanning for Cell_B and/or Cell_D. Thus, in a situation where UE 101 has detected cells that implement Band_1 (e.g., the non-preferred band, in this example) and Band_2 (e.g., the preferred band), UE 101 may first generate and provide a measurement report that indicates the detected cell(s) that implement the preferred band. In some embodiments, UE 101 may forgo generating or providing a measurement report that indicates detected cells that implement a non-preferred band, when cells that implement the preferred band have been detected (e.g., may only report the presence of Cell_B in an example situation where Cell_A, Cell_B, and Cell_C were detected). Additionally, or alternatively, UE 101 may provide a measurement report that indicates all detected cells, including cells which implement non-referred bands. This measurement report may, in some embodiments, include an ordering or a ranking of the detected cells (e.g., UE 101 may rank, in the measurement report, Cell_B and/or Cell_D ahead of Cell_B and/or Cell_C). Based on the measurement report, the network may ultimately instruct UE 101 to connect to one of the detected cells (e.g., the cell indicated in the first received measurement report from UE 101, and/or the cell that is ranked highest in the measurement report from UE 101).

Examples described herein are provided in the context of UE 101 sequentially scanning for cells in an order that is based on prioritization of bands or RATs. Similar concepts apply to embodiments in which UE 101 concurrently scans for cells, and reports detected cells in an order that is based on the prioritization of bands or RATs. For example, as described above, UE 101 may wait until scans for cells that implement a preferred band are complete before outputting measurement reports, may output measurement reports in a sequential order that is based on the prioritization of the bands implemented by the detected cells. Additionally, or alternatively, UE 101 may output a measurement report that indicates multiple detected cells, and further indicates a ranking of the multiple cells (e.g., where the ranking is based on the prioritization of the bands implemented by the detected cells).

Figure 2:
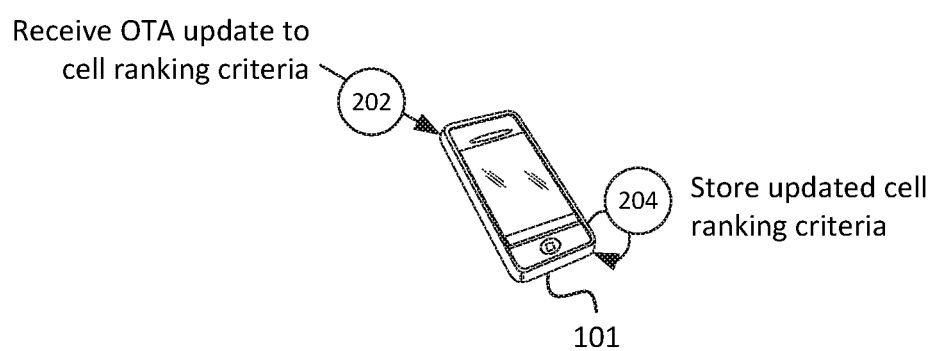
FIGS. 2 and 3 illustrate an example embodiment, in which an update to cell ranking criteria may be provided to a UE via over-the-air ("OTA") update provided by a wireless network, based on which the UE may scan the example set of candidate cells in a different order than the example shown in FIG. 1.
Figure 3:
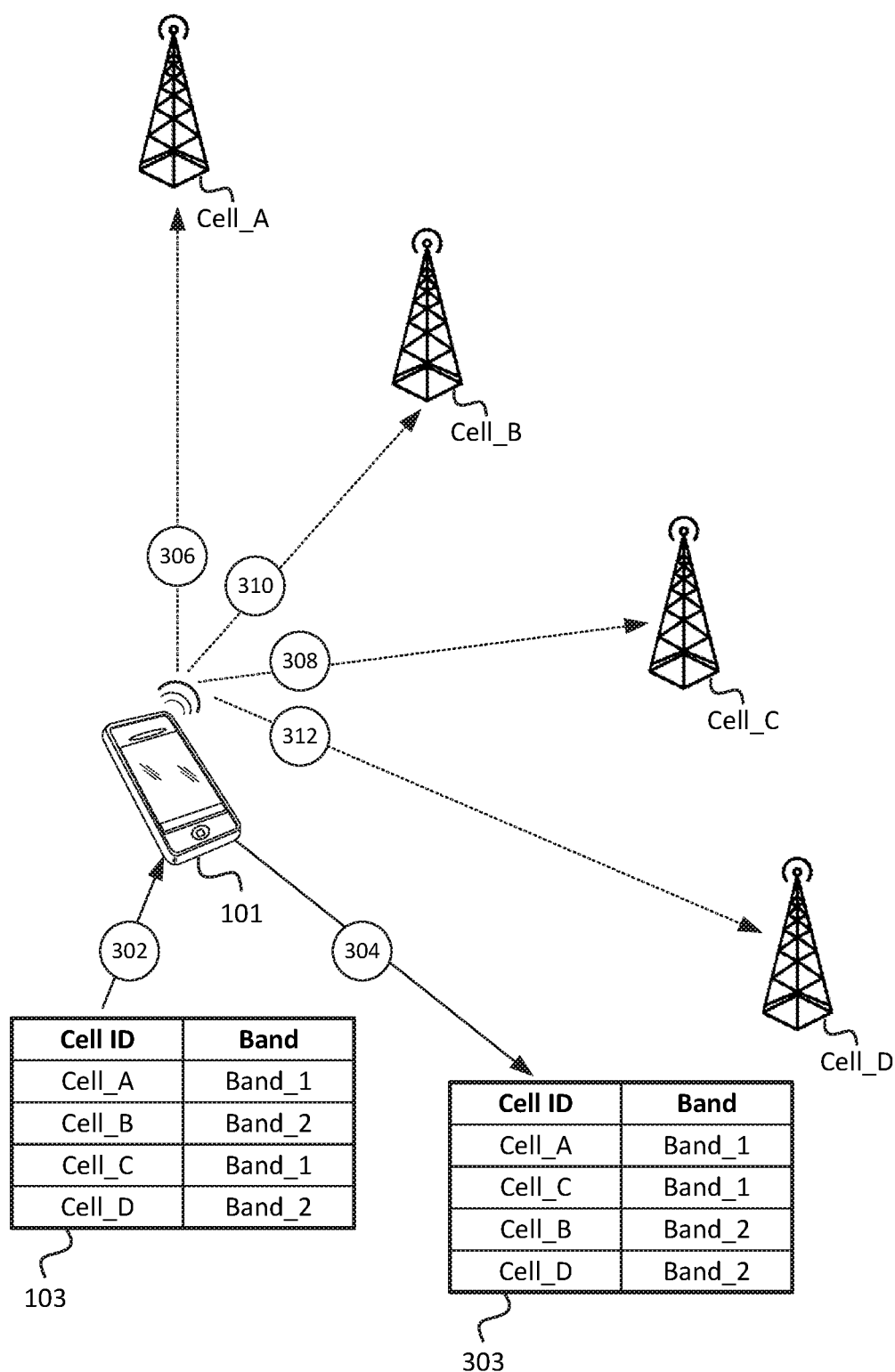

FIGS. 2 and 3 illustrate an example embodiment, in which an update to cell ranking criteria may be provided to a UE via over-the-air ("OTA") update provided by a wireless network, based on which the UE may scan the example set of candidate cells in a different order than the example shown in FIG. 1. For instance, as shown in FIG. 2, UE 101 may receive (at 202) an OTA update. The OTA update may include a firmware update, an instruction to modify information stored in a UICC and/or a SIM associated with UE 101, or the like. The OTA update may be provided via the wireless network (e.g., via one or more base stations of the wireless network) and/or via some other network (e.g., a WiFi network). The OTA update may, in some embodiments, include cell ranking criteria, which may be different from cell ranking criteria currently or previously installed at UE 101. For example, the OTA update shown in FIG. 2 may indicate that Band_1 is preferred over Band_2. As discussed above, the updated cell ranking criteria may include one or more additional factors or criteria not discussed here (e.g., load and/or capacity of cells, different thresholds for different cells, and/or other factors). UE 101 may install (at 204) the OTA update (e.g., by updating firmware, writing to a UICC or SIM, storing information from the OTA update in a data structure, etc.). In some embodiments, the OTA update may be provided by a Band Assistance Component ("BAC") and/or some other device or system associated with the wireless network.

As shown in FIG. 3, UE 101 may receive (at 302) the same set of candidate cells as in FIG. 1 (i.e., NCL 103, in this example). However, based on the updated cell ranking criteria (provided at 202), the ranking of these cells may be different than the ranking shown in FIG. 1. That is, in this example, UE 101 may rank Cell_A and Cell_C ahead of Cell_B and Cell_D, based on the implementation of Band_1 by Cell_A and Cell_C. This ranking is conceptualized in FIG. 3 by the generation (at 304) of ranked NCL 303. According to the ranking based on the updated cell ranking criteria, UE 101 may scan (at 306, 308, 310, and 312, respectively) these cells in the following order: Cell_A, Cell_C, Cell_B, and Cell_D. That is, given the same circumstances (other than the different cell ranking criteria), the ranking and scanning according to FIG. 3 may be different than that of FIG. 1. In this manner, a network may be able to provide assistance information to UE 101, in order to assist UE 101 in connecting to a cell that implements a band that may be determined by the network as capable of providing more suitable service to UE 101.

Figure 4:
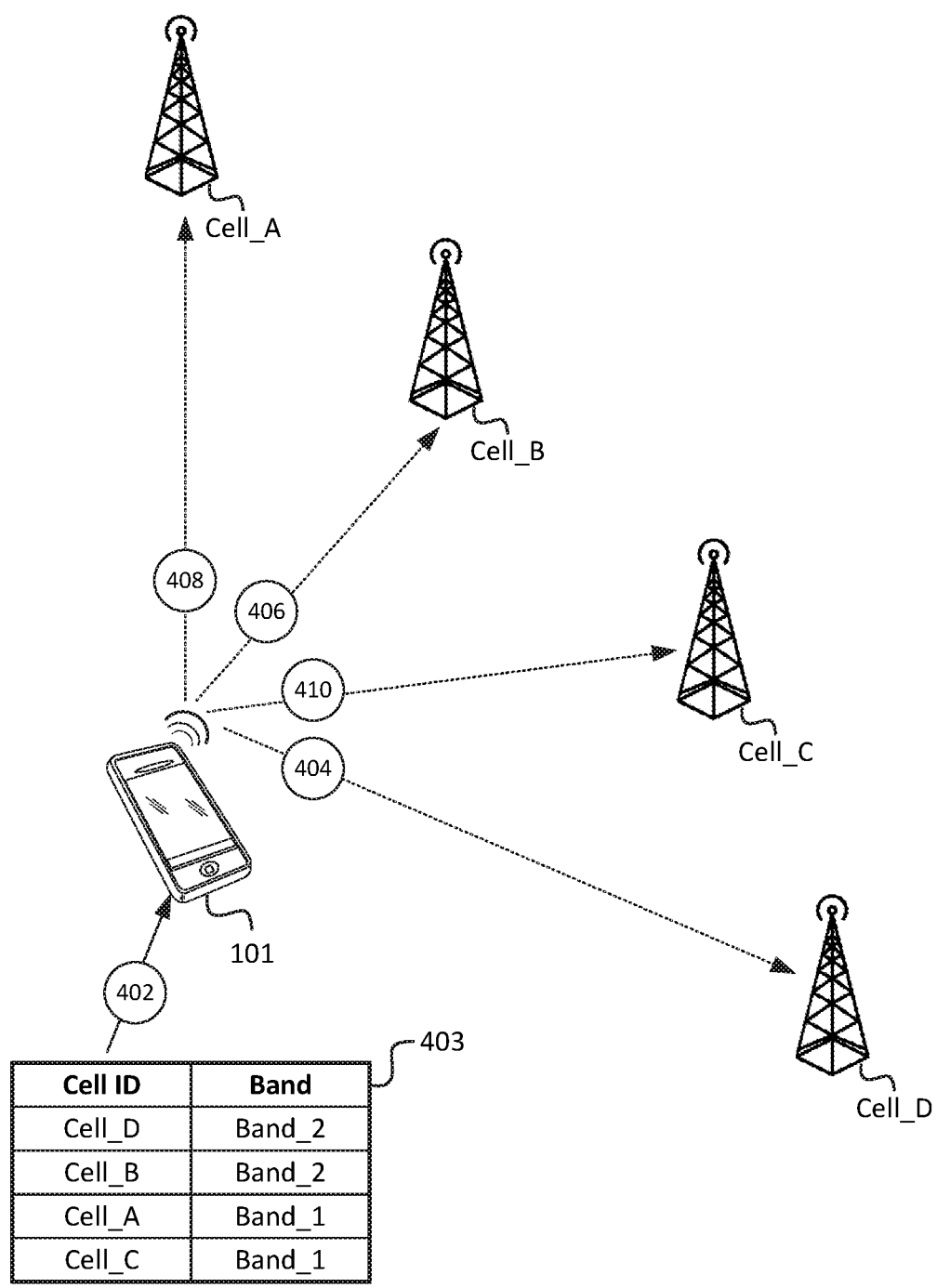
FIG. 4 illustrates an example embodiment, in which a ranking of candidate cells may be provided to a UE, based on which the UE may scan for the candidate cells.

FIG. 4 illustrates an example embodiment, in which a ranking of candidate cells may be provided to a UE, based on which the UE may scan for the candidate cells. For example, a BAC and/or one or more other components of a wireless network may provide (at 402) a ranked set of candidate cells (e.g., prioritized NCL 403) to UE 101. The ranked set of candidate cells may be provided by a MIB, a SIB, and/or some other communication from the wireless network (e.g., a base station to which UE 101 is anchored) to UE 101. The ranking of candidate cells in NCL 403 may be performed (e.g., by the BAC and/or some other device or system) based on bands implemented by the cells (e.g., whether the candidate cells implement a preferred band), and/or one or more other factors not discussed in detail herein. In some embodiments, the ranked set of candidate cells may be included with a flag or other indicator (e.g., a flag in a MIB, a SIB, etc.) that the set of candidate cells is ranked. In some embodiments, this flag (or a particular value for this flag) may indicate to UE 101 that the set of candidate cells is ranked, and UE 101 should therefore scan for the cells in the order indicated (e.g., without re-ranking the cells). In some embodiments, the absence of such a flag (or an explicit setting of the flag) may indicate that a given set of candidate cells is not ranked, and UE 101 may re-rank the candidate cells (e.g., in a manner similarly described above with respect to FIG. 1 or FIG. 3). Accordingly, as shown, UE 101 may scan (at 404, 406, 408, and 410, respectively) in the following order: Cell_D, Cell_B, Cell_A, and Cell_C.

Figure 5:
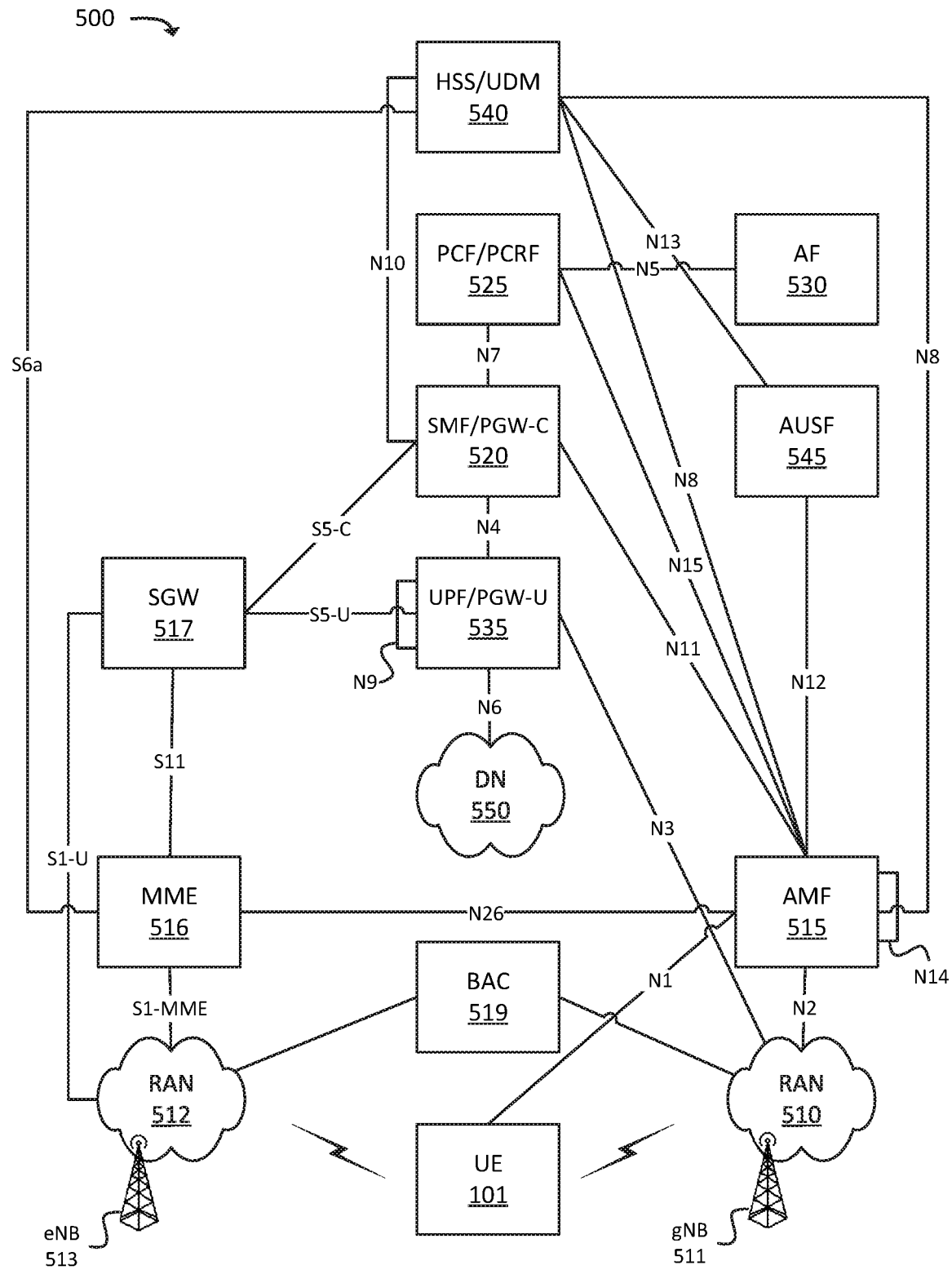
FIG. 5 illustrates an example environment in which one or more embodiments, described herein, may be implemented.

FIG. 5 illustrates an example environment 500, in which one or more embodiments may be implemented. In some embodiments, environment 500 may correspond to a 5G network, and/or may include elements of a 5G network. In some embodiments, environment 500 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 500 may include UE 101, radio access network ("RAN") 510 (which may include one or more Next Generation Node Bs ("gNBs") 511), RAN 512 (which may include one or more one or more evolved Node Bs ("eNBs") 513), Access and Mobility Management Function ("AMF") 515, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, Home Subscriber Server ("HSS")/Unified Data Management ("UDM") 540, Authentication Server Function ("AUSF") 545, BAC 519, and Data Network ("DN") 550.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 101 may include a computation and communication device, such as a wireless mobile communication device that is capable of communicating with RAN 510 and/or DN 550. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 101 may send traffic to and/or receive traffic (e.g., user plane traffic) from DN 550 via RAN 510 and UPF/PGW-U 535.

RAN 510 may be, or may include, a 5G RAN that includes one or more base stations (e.g., one or more gNBs 511), via which UE 101 may communicate with one or more other elements of environment 500. UE 101 may communicate with RAN 510 via an air interface (e.g., as provided by gNB 511). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, AMF 515, and/or one or more other devices or networks) and may communicate the traffic to UE 101 via the air interface.

RAN 512 may be, or may include, an LTE RAN that includes one or more base stations (e.g., one or more eNBs 513), via which UE 101 may communicate with one or more other elements of environment 500. UE 101 may communicate with RAN 512 via an air interface (e.g., as provided by eNB 513). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, SGW 517, and/or one or more other devices or networks) and may communicate the traffic to UE 101 via the air interface.

AMF 515 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 515, which communicate with each other via the N14 interface (denoted in FIG. 5 by the line marked "N14" originating and terminating at AMF 515).

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 101. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 101, from DN 550, and may forward the user plane data toward UE 101 (e.g., via RAN 510, SMF/PGW-C 520, and/or one or more other devices). In some embodiments, multiple UPFs 535 may be deployed (e.g., in different geographical locations), and the delivery of content to UE 101 may be coordinated via the N9 interface (e.g., as denoted in FIG. 5 by the line marked "N9" originating and terminating at UPF/PGW-U 535). Similarly, UPF/PGW-U 535 may receive traffic from UE 101 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 101.

BAC 519 may include one or more devices, systems, VNFs, etc., that perform one or more functions described herein. For example, BAC 519 may provide cell ranking criteria (e.g., via RAN 512 and/or RAN 510) to UE 101, may rank neighboring cells (e.g., based on bands implemented by the cells), may provide ranked NCLs to UE 101, may instruct elements of RAN 512 and/or RAN 510 (e.g., eNB 513 and/or gNB 511) to provide ranked NCLs to UE 101, and/or may perform other suitable functions described herein. In some embodiments, some or all of the functionality of BAC 519 may be performed by eNB 513, gNB 511, and/or UE 101.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 101 may communicate, through DN 550, with data servers, other UEs 101, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 101 may communicate.

Figure 6:
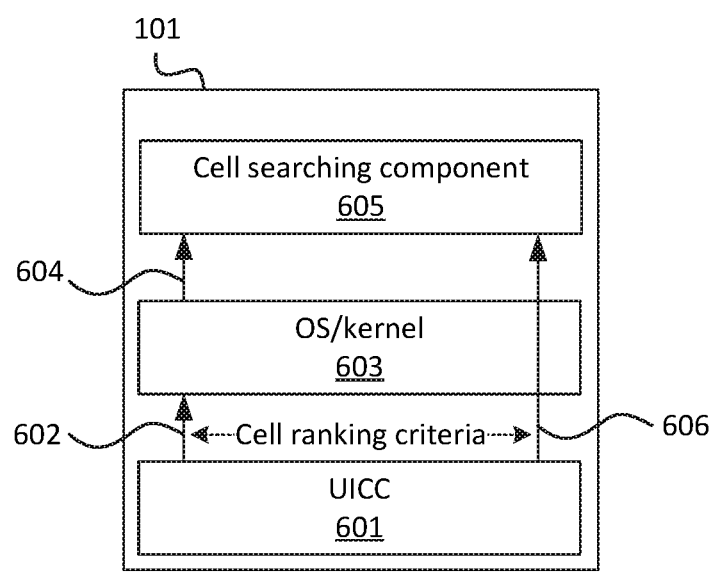
FIG. 6 illustrates an example of an RF scanning component, executing on a UE, obtaining priority information from a Universal Integrated Circuit Card ("UICC") associated with the UE.

FIG. 6 illustrates one or more functional components of UE 101, such as UICC 601, operating system ("OS")/kernel 603, and cell searching component 605. As similarly discussed above, UICC 601 may receive and store cell search criteria for UE 101 (e.g., as received via an OTA update, during an initial provisioning process, and/or at some other time).

In some embodiments, OS/kernel 603 of UE 101 may obtain (at 602) the cell ranking criteria from UICC 601. For example, OS/kernel 603 may read the contents of UICC 601 to determine the cell search criteria. In some embodiments, OS/kernel 603 may store the cell ranking criteria (e.g., as a global system variable).

Cell searching component 605 may include hardware circuitry and/or software logic to scan for cells based on a ranking of candidate cells (e.g., as ranked by cell searching component 605, by one or more other components of UE 101, and/or as indicated in a ranked set of candidate cells received from the wireless network). Cell searching component 605 may obtain (at 604) the cell ranking criteria from OS/kernel 603 (e.g., via an application programming interface ("API") or some other suitable communication pathway). Additionally, or alternatively, cell searching component 605 may read (at 606) UICC 601 directly. Once cell searching component 605 obtains the cell ranking criteria for UE 101, cell searching component 605 may rank and/or scan for candidate cells in an order that is based on a ranking that is performed based on the cell search criteria (e.g., as similarly described above with respect to FIG. 4).

Figure 7:
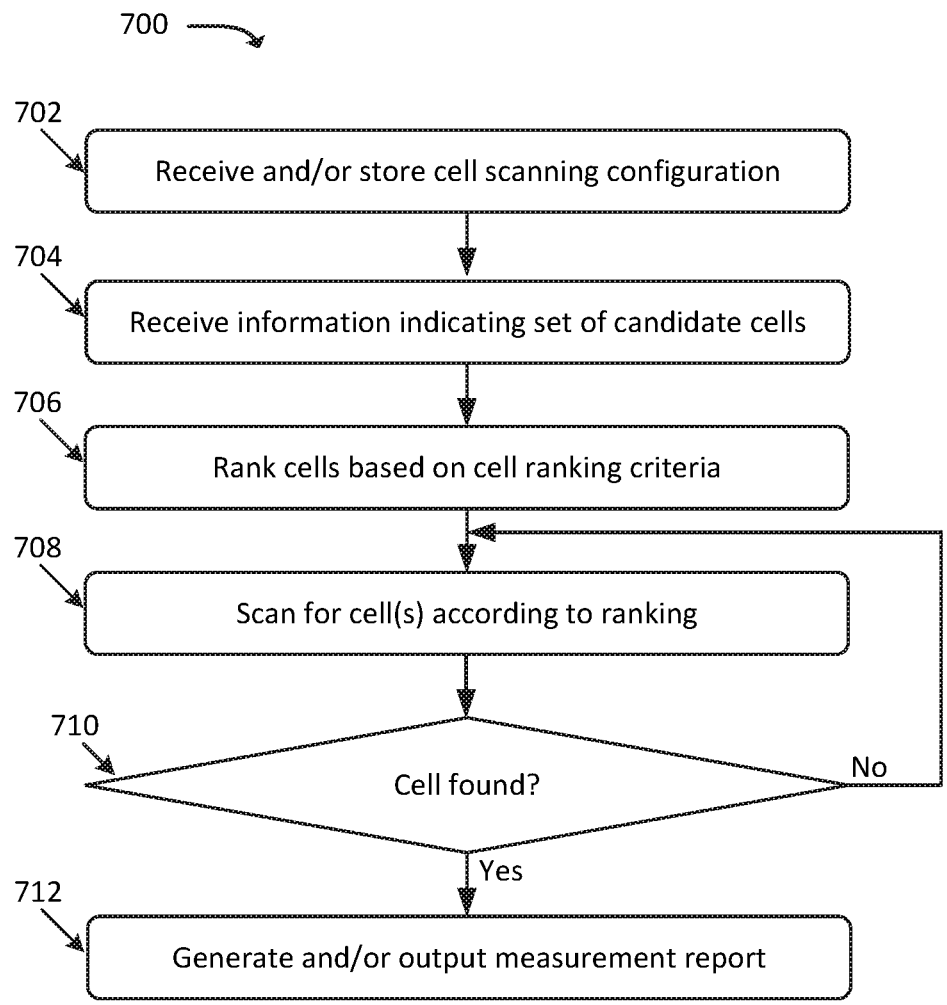
FIG. 7 illustrates an example process for ranking a set of candidate cells and scanning for the candidate cells in an order that is based on the ranking, in accordance with some embodiments.

FIG. 7 illustrates an example process 700 for ranking a set of candidate cells and scan for the candidate cells in an order that is based on the ranking. In some embodiments, some or all of process 700 may be performed by UE 101. In some embodiments, one or more other devices may perform some or all of process 700 (e.g., in concert with, and/or in lieu of, UE 101).

As shown, process 700 may include receiving and storing (at 702) a cell scanning configuration. For example, UE 101 may receive cell ranking criteria (e.g., from BAC 519 and/or some other device or system). As discussed above the cell ranking criteria may be received via an OTA update, during an initial provisioning process, and/or at some other time. UE 101 may store or implement the cell ranking criteria (e.g., by storing the cell ranking criteria in a UICC, SIM, etc. of UE 101; by updating firmware or one or more applications executing on UE 101; update a data structure that contains cell ranking criteria; etc.).

Process 700 may further include receiving (at 704) information indicating a set of candidate cells. For example, UE 101 may receive an NCL (or other indicator(s) of cells for which UE 101 should scan). As discussed above, the NCL may or may not include a ranked set of cells. For the purposes of explanation of this figure, the NCL may be assumed to not be ranked. The NCL may include Cell IDs, indicators of bands implemented by respective cells, timing information (and/or other information that may facilitate the discovery of or communication with each candidate cell), and/or other suitable information.

Process 700 may additionally include (at 706) ranking the cells based on the cell ranking criteria. For instance, UE 101 may identify cells, indicated in the set of candidate cells, that implement a preferred band (e.g., where the preferred band is indicated by the cell ranking criteria). In situations where the cell ranking criteria indicates three or more respective priorities for three or more bands, UE 101 may rank the cells (indicated in the set of candidate cells) according to the priorities indicated in the cell ranking criteria. As mentioned above, in situations where the cell ranking criteria indicates criteria other than preferred or prioritized bands, UE 101 may also use these other criteria to rank the cells.

Process 700 may also include scanning (at 708) for cells according to the ranking. For example, UE 101 may sequentially scan for the cells in an order based on the ranking. For example, UE 101 may first scan for a highest ranking cell. In some embodiments, UE 101 may use timing information and/or other suitable information, included in the set of candidate cells (received at 704) to detect and/or communicate with the cells. For instance, the timing information may be used by UE 101 to locate (e.g., in a time-and-frequency domain) a pilot signal, a MIB, a SIB, etc., broadcasted by the cells.

Process 700 may further include determining (at 710) whether a given cell was found. For example, if the highest ranked cell was found as a result of the scanning (at 710—YES), then UE 101 may generate and output (at 712) a measurement report. As mentioned above, UE 101 may scan (at 708) for multiple cells (e.g., concurrently), and may wait until the scanning for cells implementing a preferred band is complete, before generating or outputting (at 712) the measurement report. The measurement report may thus indicate cells of the preferred band (e.g., may only indicate cells of the preferred band, and/or may indicate cells of the preferred band in a ranked or prioritized manner), even in instances where cells of a non-preferred band were detected first.

The measurement report may indicate signal quality (e.g., Received Signal Strength Indicator ("RSSI"), Signal-to-Interference-and-Noise-Ratio ("SINR"), and/or other measures of signal strength or quality) between UE 101 and the cell. UE 101 may output the measurement report to BAC 519, a cell to which UE 101 is currently anchored, and/or some other device or system of the wireless network. Based on the measurement report, the network (e.g., BAC 519, a cell to which UE 101 is anchored, and/or some other network device or system) may instruct (e.g., via a RRC Reconfiguration Request message sent from a cell to which UE 101 is currently anchored and/or some other type of message) UE 101 to connect to the candidate cell.

In some situations, the network may receive the measurement report (e.g., from UE 101), and may forgo instructing UE 101 to connect to the candidate cell, and/or may instruct UE 101 not to connect to the candidate cell. For example, the measurement report may not indicate a satisfactory level of signal quality, based on which the network may determine that UE 101 should not connect to the candidate cell. The network may send a message (e.g., via a RRC Reconfiguration Request message and/or some other suitable message) indicating that UE 101 should not connect to the candidate cell, and/or may not send any message related to the candidate cell. In the latter scenario, UE 101 may determine that if an instruction was not received within a threshold amount of time (e.g., within 1 second, 10 seconds, etc., of providing the measurement report), then UE 101 should not connect to the candidate cell, and may scan (at 708) the next cell based on the determined ranking. Similarly, if a particular cell was not found based on the scanning (at 710—NO), then process 700 may include scanning (at 708) the next cell in the order determined based on the ranking.

Figure 8:
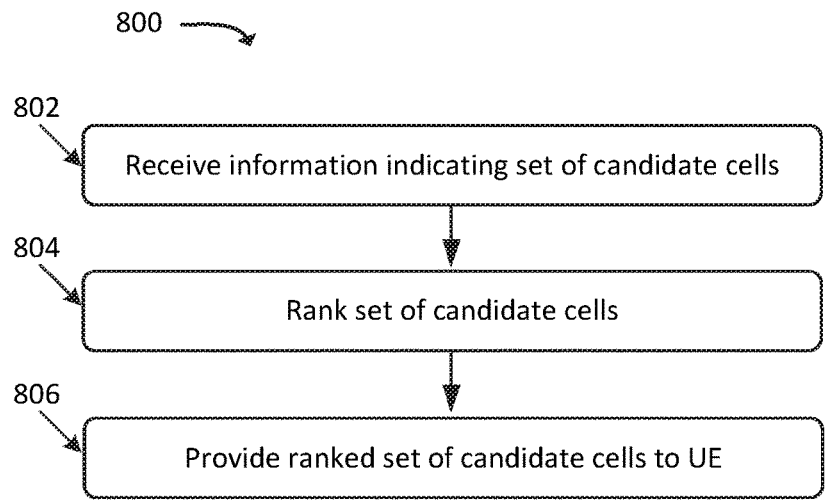
FIG. 8 illustrates an example process for providing a ranked set of candidate cells to a UE, in accordance with some embodiments.

FIG. 8 illustrates an example process 800 for providing a ranked set of candidate cells to a UE. In some embodiments, some or all of process 800 may be performed by BAC 519. In some embodiments, one or more other devices may perform some or all of process 800 (e.g., in concert with, and/or in lieu of, BAC 519).

As shown, process 800 may include receiving (at 802) a set of candidate cells. For example, BAC 519 may receive an NCL from a base station (e.g., an eNB), which may indicate one or more cells that are proximate to the base station.

Process 800 may further include ranking (at 804) the set of candidate cells. For example, BAC 519 may rank the candidate cells based on bands implemented by the candidate cells, and/or one or more other criteria.

Process 800 may additionally include providing (at 806) the ranked set of candidate cells to UE 101. For example, BAC 519 and/or a base station to which UE 101 is anchored (and which is communicatively coupled to BAC 519) may output the ranked set of candidate cells to UE 101. As mentioned above, the ranked set of candidate cells may include a flag or other indicator, indicating that the set of candidate cells is ranked. As also mentioned herein, UE 101 may determine that UE 101 should not modify the order of the calls when the flag indicates that the set of candidate cells is ranked.

Figure 9:
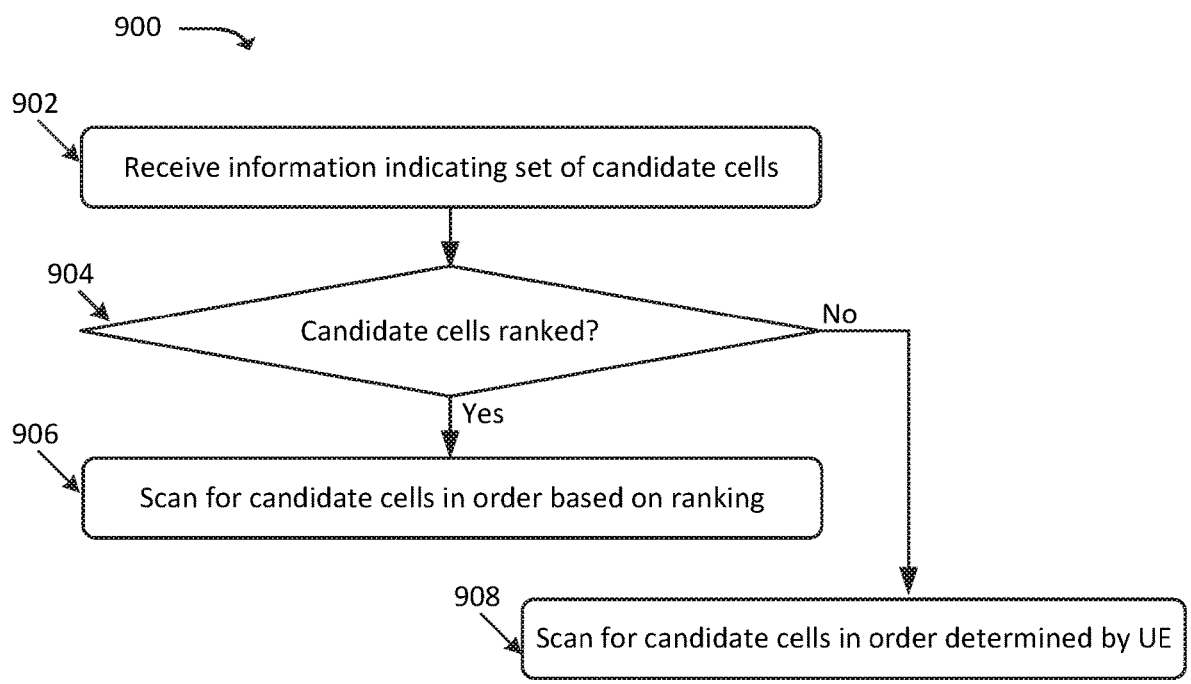
FIG. 9 illustrates an example process for scanning for candidate cells based on a network-provided ranking, in accordance with some embodiments.

For example, FIG. 9 illustrates an example process 900 for scanning for candidate cells based on whether a network-provided set of candidate cells is ranked. In some embodiments, some or all of process 900 may be performed by UE 101. In some embodiments, one or more other devices may perform some or all of process 900 (e.g., in concert with, and/or in lieu of, UE 101).

As shown, process 900 may include receiving (at 902) a set of candidate cells (e.g., an NCL). Process 900 may further include determining (at 904) whether the set of candidate cells is ranked (e.g., includes a flag or other indicator indicating that the set of candidate cells is ranked). If the set of candidate cells is ranked (at 904—YES), then process 900 may include scanning (at 906) for candidate cells in an order that is based on the indicated ranking. If, on the other hand, the set of candidate cells is not ranked (at 904—NO), then process 900 may include scanning (at 908) for candidate cells in an order that may be determined by UE 101 (e.g., in accordance with process 700 and/or some other process).

Figure 10:
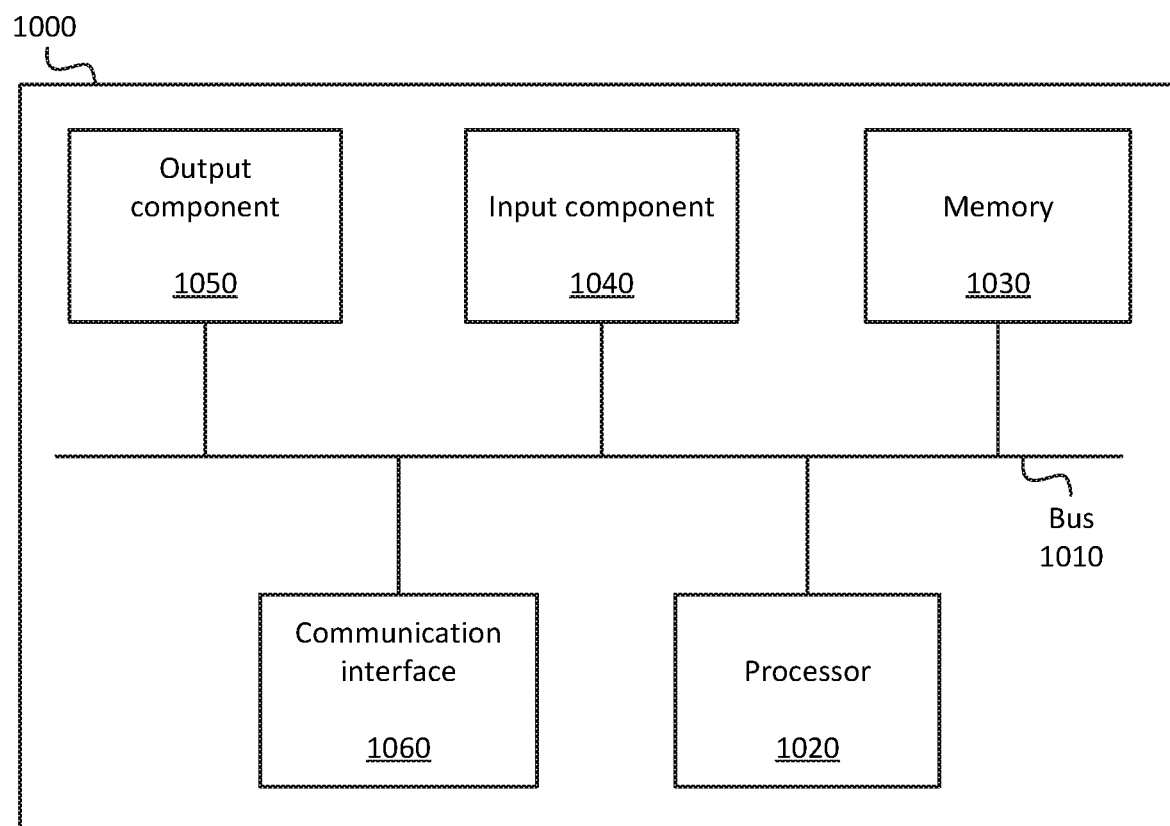
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4 and 7-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive information indicating a set of candidate cells, the information identifying one or more respective radio frequency ("RF") bands implemented by each cell of the set of candidate cells;
rank the set of candidate cells based on the RF bands implemented by each cell of the set of candidate cells;
perform one or more scans to detect a presence of one or more of the cells, of the set of candidate cells;
detect, based on the one or more scans, a plurality of cells of the set of candidate cells, wherein detecting the plurality of cells of the set of candidate cells includes:
scanning for a first cell that is a highest ranked cell of the set of candidate cells;
scanning, concurrently with the scan for the first cell, for a second cell that is a lower ranked cell of the set of candidate cells;
detecting a presence of the second cell while the scan for the first cell is ongoing;
forgoing outputting the information identifying the at least one of the detected plurality of cells after detecting the second cell and while the scan for the first cell is ongoing; and
detecting a presence of the first cell after the second cell has been detected; and
output information that identifies at least one of the detected plurality of cells, the outputting being based on the ranking of the plurality of detected cells, wherein outputting the information identifying the at least one of the detected plurality of cells includes:
indicating, in the output information, the detected presence of the first cell, without indicating the detected presence of the second cell.

2. The device of claim 1, wherein performing the one or more scans to detect the presence of one or more of the cells, of the set of candidate cells, includes performing the one or more scans in an order that is based on the ranking of the set of candidate cells.

3. The device of claim 1, wherein the ranking includes:
identifying a first subset, of the set of candidate cells, that implements a first RF band;
identifying a second subset, of the set of candidate cells, that implements a second RF band; and
ranking the candidate cells of the first subset higher than the candidate cells of the second subset based on identifying that the first subset of candidate cells implement the first RF band and that the second subset of candidate cells implement the second RF band.

4. A device, comprising:
one or more processors configured to:
receive information indicating a set of candidate cells, the information identifying one or more respective radio frequency ("RF") bands implemented by each cell of the set of candidate cells;
rank the set of candidate cells based on the RF bands implemented by each cell of the set of candidate cells;
perform one or more scans to detect a presence of one or more of the cells, of the set of candidate cells;
detect, based on the one or more scans, a plurality of cells of the set of candidate cells, wherein detecting the plurality of cells, of the set of candidate cells includes:
scanning for a first cell that is a highest ranked cell of the set of candidate cells;
scanning, concurrently with the scan for the first cell, for a second cell that is a lower ranked cell of the set of candidate cells;
detecting a presence of the second cell while the scan for the first cell is ongoing;
forgoing outputting the information identifying the at least one of the detected plurality of cells after detecting the second cell and while the scan for the first cell is ongoing; and
detecting a presence of the first cell after the second cell has been detected; and
output information that identifies at least one of the detected plurality of cells, the outputting being based on the ranking of the plurality of detected cells, wherein outputting the information identifying the at least one of the detected plurality of cells includes indicating:
the detected presence of the first cell and the second cell, and
an indication that the first cell is prioritized with respect to the second cell.

5. The device of claim 4, wherein the ranking includes:
identifying a first subset, of the set of candidate cells, that implements a first RF band;
identifying a second subset, of the set of candidate cells, that implements a second RF band; and
ranking the candidate cells of the first subset higher than the candidate cells of the second subset based on identifying that the first subset of candidate cells implement the first RF band and that the second subset of candidate cells implement the second RF band.

6. The device of claim 4, wherein the one or more processors are further configured to:
receive cell search criteria indicating at least one preferred RF band, out of a set of candidate RF bands,
wherein the ranking is based on identifying which cells, of the set of candidate cells, implement the at least one preferred RF band.

7. The device of claim 4, wherein the information, indicating the set of candidate cells, is a first set of information indicating a first set of candidate cells, wherein the one or more processors are further configured to:
receive a second set of information indicating a second set of candidate cells;
identify that the second set of information indicates a ranking of the second set of candidate cells; and
perform, in an order that is based on the ranking of the second set of cells, one or more scans to detect a presence of one or more of the cells, of the second set of candidate cells.

8. A non-transitory computer-readable medium, storing a plurality of processor-executable instructions to:
receive information indicating a set of candidate cells, the information identifying one or more respective radio frequency ("RF") bands implemented by each cell of the set of candidate cells;

rank the set of candidate cells based on the RF bands implemented by each cell of the set of candidate cells;

perform one or more scans to detect a presence of one or more of the cells, of the set of candidate cells;

detect, based on the one or more scans, a plurality of cells of the set of candidate cells, wherein the processor-executable instructions, to detect the plurality of cells, of the set of candidate cells, include processor-executable instructions to:

scan for a first cell that is a highest ranked cell of the set of candidate cells;

scan, concurrently with the scan for the first cell, for a second cell that is a lower ranked cell of the set of candidate cells;

detect a presence of the second cell while the scan for the first cell is ongoing;

forgo outputting the information identifying the at least one of the detected plurality of cells after detecting the second cell and while the scan for the first cell is ongoing; and detect a presence of the first cell after the second cell has been detected; and output information that identifies at least one of the detected plurality of cells, the outputting being based on the ranking of the plurality of detected cells, wherein the processor-executable instructions, to output the information identifying the at least one of the detected plurality of cells, include processor-executable instructions to:

indicate, in the output information, the detected presence of the first cell, without indicating the detected presence of the second cell.

9. The non-transitory computer-readable medium of claim 8, wherein performing the one or more scans to detect the presence of one or more of the cells, of the set of candidate cells, includes performing the one or more scans in an order that is based on the ranking of the set of candidate cells.

10. The non-transitory computer-readable medium of claim 8, wherein the ranking includes:

identifying a first subset, of the set of candidate cells, that implements a first RF band;

identifying a second subset, of the set of candidate cells, that implements a second RF band; and ranking the candidate cells of the first subset higher than the candidate cells of the second subset based on identifying that the first subset of candidate cells implement the first RF band and that the second subset of candidate cells implement the second RF band.

11. A non-transitory computer-readable medium, storing a plurality of processor-executable instructions to:

receive information indicating a set of candidate cells, the information identifying one or more respective radio frequency ("RF") bands implemented by each cell of the set of candidate cells;

rank the set of candidate cells based on the RF bands implemented by each cell of the set of candidate cells;

perform one or more scans to detect a presence of one or more of the cells, of the set of candidate cells;

detect, based on the one or more scans, a plurality of cells of the set of candidate cells, wherein the processor-executable instructions, to detect the plurality of cells, of the set of candidate cells, include processor-executable instructions to:

scan for a first cell that is a highest ranked cell of the set of candidate cells;

scan, concurrently with the scan for the first cell, for a second cell that is a lower ranked cell of the set of candidate cells;

detect a presence of the second cell while the scan for the first cell is ongoing;

forgo outputting the information identifying the at least one of the detected plurality of cells after detecting the second cell and while the scan for the first cell is ongoing; and detect a presence of the first cell after the second cell has been detected; and output information that identifies at least one of the detected plurality of cells, the outputting being based on the ranking of the plurality of detected cells, wherein the processor-executable instructions, to output the information identifying the at least one of the detected plurality of cells, include processor-executable instructions to indicate:

the detected presence of the first cell and the second cell, and an indication that the first cell is prioritized with respect to the second cell.

12. The non-transitory computer-readable medium of claim 11, wherein the ranking includes:

identifying a first subset, of the set of candidate cells, that implements a first RF band;

identifying a second subset, of the set of candidate cells, that implements a second RF band; and ranking the candidate cells of the first subset higher than the candidate cells of the second subset based on identifying that the first subset of candidate cells implement the first RF band and that the second subset of candidate cells implement the second RF band.

13. The non-transitory computer-readable medium of claim 11, wherein the plurality of processor-executable instructions further include processor-executable instructions to:

receive cell search criteria indicating at least one preferred RF band, out of a set of candidate RF bands, wherein the ranking is based on identifying which cells, of the set of candidate cells, implement the at least one preferred RF band.

14. The non-transitory computer-readable medium of claim 11, wherein the set of information, indicating the set of candidate cells, is a first set of information indicating a first set of candidate cells, wherein the plurality of processor-executable instructions further include processor-executable instructions to:

receive a second set of information indicating a second set of candidate cells;

identify that the second set of information indicates a ranking of the second set of candidate cells; and perform, in an order that is based on the ranking of the second set of cells, one or more scans to detect a presence of one or more of the cells, of the second set of candidate cells.

15. A method, comprising:

receiving information indicating a set of candidate cells, the information identifying one or more respective radio frequency ("RF") bands implemented by each cell of the set of candidate cells;

ranking the set of candidate cells based on the RF bands implemented by each cell of the set of candidate cells;

performing one or more scans to detect a presence of one or more of the cells, of the set of candidate cells;

detecting, based on the one or more scans, a plurality of cells of the set of candidate cells, wherein detecting the plurality of cells, of the set of candidate cells includes:
scanning for a first cell that is a highest ranked cell of the set of candidate cells;
scanning, concurrently with the scan for the first cell, for a second cell that is a lower ranked cell of the set of candidate cells;
detecting a presence of the second cell while the scan for the first cell is ongoing;
forgoing outputting the information identifying the at least one of the detected plurality of cells after detecting the second cell and while the scan for the first cell is ongoing; and
detecting a presence of the first cell after the second cell has been detected; and
outputting information that identifies at least one of the detected plurality of cells, the outputting being based on the ranking of the plurality of detected cells, wherein outputting the information identifying the at least one of the detected plurality of cells includes:
indicating, in the output information, the detected presence of the first cell, without indicating the detected presence of the second cell.

16. The method of claim 15, wherein performing the one or more scans to detect the presence of one or more of the cells, of the set of candidate cells, includes performing the one or more scans in an order that is based on the ranking of the set of candidate cells.

17. The method of claim 15, wherein the ranking includes:
identifying a first subset, of the set of candidate cells, that implements a first RF band;
identifying a second subset, of the set of candidate cells, that implements a second RF band; and
ranking the candidate cells of the first subset higher than the candidate cells of the second subset based on identifying that the first subset of candidate cells implement the first RF band and that the second subset of candidate cells implement the second RF band.

18. A method, comprising:
receiving information indicating a set of candidate cells, the information identifying one or more respective radio frequency ("RF") bands implemented by each cell of the set of candidate cells;
ranking the set of candidate cells based on the RF bands implemented by each cell of the set of candidate cells;
performing one or more scans to detect a presence of one or more of the cells, of the set of candidate cells;
detecting, based on the one or more scans, a plurality of cells of the set of candidate cells, wherein detecting the plurality of cells, of the set of candidate cells includes:
scanning for a first cell that is a highest ranked cell of the set of candidate cells;
scanning, concurrently with the scan for the first cell, for a second cell that is a lower ranked cell of the set of candidate cells;
detecting a presence of the second cell while the scan for the first cell is ongoing;
forgoing outputting the information identifying the at least one of the detected plurality of cells after detecting the second cell and while the scan for the first cell is ongoing; and
detecting a presence of the first cell after the second cell has been detected; and
outputting information that identifies at least one of the detected plurality of cells, the outputting being based on the ranking of the plurality of detected cells, wherein outputting the information identifying the at least one of the detected plurality of cells includes indicating:
the detected presence of the first cell and the second cell, and
an indication that the first cell is prioritized with respect to the second cell.

19. The method of claim 18, wherein the ranking includes:
identifying a first subset, of the set of candidate cells, that implements a first RF band;
identifying a second subset, of the set of candidate cells, that implements a second RF band; and
ranking the candidate cells of the first subset higher than the candidate cells of the second subset based on identifying that the first subset of candidate cells implement the first RF band and that the second subset of candidate cells implement the second RF band.

20. The method of claim 18, further comprising:
receiving cell search criteria indicating at least one preferred RF band, out of a set of candidate RF bands,
wherein the ranking is based on identifying which cells, of the set of candidate cells, implement the at least one preferred RF band.

* * * * *